US009609324B2

(12) United States Patent
Kim et al.

(10) Patent No.: US 9,609,324 B2
(45) Date of Patent: Mar. 28, 2017

(54) IMAGE ENCODING/DECODING METHOD AND DEVICE USING COEFFICIENTS OF ADAPTIVE INTERPOLATION FILTER

(71) Applicant: SK TELECOM CO., LTD., Seoul (KR)

(72) Inventors: Hayoon Kim, Seongnam-si (KR); Donghoon Han, Seoul (KR); Kioh Kim, Anyang-si (KR); Daeyeon Kim, Seoul (KR); Yunglyul Lee, Seoul (KR); Joohee Moon, Seoul (KR); Haekwang Kim, Seoul (KR); Byeungwoo Jeon, Seongnam-si (KR)

(73) Assignee: SK TELECOM CO., LTD., Seoul (KR)

(*) Notice: Subject to any disclaimer, the term of this patent is extended or adjusted under 35 U.S.C. 154(b) by 144 days.

(21) Appl. No.: 14/552,085

(22) Filed: Nov. 24, 2014

(65) Prior Publication Data

US 2015/0078437 A1    Mar. 19, 2015

Related U.S. Application Data

(63) Continuation of application No. 13/125,956, filed as application No. PCT/KR2009/005963 on Oct. 16, 2009, now Pat. No. 8,897,357.

(30) Foreign Application Priority Data

Oct. 24, 2008 (KR) ........................ 10-2008-0104515

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/139* (2014.11); *H04N 19/14* (2014.11);
(Continued)

(58) Field of Classification Search
CPC .. H04N 19/139; H04N 19/172; H04N 19/176; H04N 19/61
(Continued)

(56) References Cited

U.S. PATENT DOCUMENTS 7,308,145 B2 * 12/2007 Abe ..................... H04N 19/105
375/240.12
2004/0076333 A1 * 4/2004 Zhang ................. H04N 19/197
382/238

FOREIGN PATENT DOCUMENTS

KR    1020070027236 A    3/2007
KR    1020080041935 A    5/2008

OTHER PUBLICATIONS

International Search Report for PCT/KR2009/005963 dated Jun. 8, 2010.

* cited by examiner

*Primary Examiner* — Tat Chio
*Assistant Examiner* — Nguyen Truong
(74) *Attorney, Agent, or Firm* — Hauptman Ham, LLP

(57) ABSTRACT

An image encoding and decoding method comprising: a coefficient calculator for calculating adaptive interpolation filter coefficient of a current frame; an image encoder for interpolating reference frames using the adaptive interpolation filter coefficient of the current frame and encoding the current frame using the interpolated reference frames; a filter flag encoder for generating and encoding a coefficient-inserted flag or coefficient non-inserted flag as a filter flag according to the adaptive interpolation filter coefficient of the current frame; a coefficient encoder for encoding the
(Continued)

adaptive interpolation filter coefficient of the current frame when the filter flag is a coefficient-inserted flag; and a bit stream generator for generating and outputting a bit stream, which includes the encoded current frame and encoded filter flag, and further includes encoded adaptive interpolation filter coefficient of the current frame when the filter flag is the coefficient-inserted flag.

15 Claims, 7 Drawing Sheets

(51) Int. Cl.
  *H04N 19/61* (2014.01)
  *H04N 19/14* (2014.01)
  *H04N 19/523* (2014.01)
  *H04N 19/172* (2014.01)
  *H04N 19/139* (2014.01)
(52) U.S. Cl.
  CPC ......... *H04N 19/172* (2014.11); *H04N 19/176* (2014.11); *H04N 19/523* (2014.11); *H04N 19/61* (2014.11)
(58) Field of Classification Search
  USPC .................................................... 375/240.02
  See application file for complete search history.

IMAGE ENCODING/DECODING METHOD AND DEVICE USING COEFFICIENTS OF ADAPTIVE INTERPOLATION FILTER

CROSS REFERENCE TO RELATED APPLICATION

The present application is a continuation of U.S. patent application Ser. No. 13/125,956, filed on Apr. 25, 2011, which is the National Phase application of International Application No. PCT/KR2009/005963, filed on Oct. 16, 2009, which designates the United States and was published in Korean. Further, this application claims the priority of Korean Patent Application No. 10-2008-0104515, filed on Oct. 24, 2008 in the KIPO (Korean Intellectual Property Office). This application, in its entirety, is incorporated herein by reference the entire disclosure of which is incorporated herein by reference.

TECHNICAL FIELD

The present disclosure relates to an image encoding/decoding method and device using coefficients of an adaptive interpolation filter. More particularly, the present disclosure relates to a method and an apparatus for image encoding/decoding, which can improve the encoding efficiency or the compression efficiency by adaptively determining coefficients of an interpolation filter in encoding an image while reducing the quantity of bits for encoding of information on the adaptively determined filter coefficients.

BACKGROUND ART

The statements in this section merely provide background information related to the present disclosure and may not constitute the prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264.

In H.264/AVC (hereinafter referred to as 'H.264'), in order to interpolate a reference frame used in the inter prediction, a reference frame interpolated with ¼ fractional pixel precision is generated using a 6-tap filter and an average value filter. More specifically, the 6-tap filter is used so as to generate the ½ fractional pixel and the average value filter is used so as to generate the ¼ fractional pixel. As described above, when the inter prediction is performed based on H.264, a motion is predicted and compensated with the ¼ fractional pixel precision by using the reference frame interpolated in the fractional pixel precision, so that it is possible to obtain the higher compression efficiency than the conventional method which uses only the reference frame having the integer pixel precision.

Further, in H.264, not only fixed interpolation filter coefficients may be used for an interpolation of a reference image with the fractional pixel precision, but the coefficients of the interpolation filter may also be adaptively determined at each frame for the interpolation of a reference image. To this end, H.264 encodes the image of each frame by using the conventional fixed interpolation filter coefficients, so as to find motion information and information (including the block type and the block shape) of each block mode. In this event, if the block mode is an inter block mode, information required for obtaining the coefficients of the interpolation filter is accumulated and the encoded information is not included in the bit stream. When the encoding for one frame is completed, coefficients of the interpolation filter are generated by using the accumulated information, a reference image is interpolated by using the generated coefficients, and an image is then encoded by using the interpolated reference image.

However, since the filter coefficients obtained at every frame in the way described above are not optimum for all the inter block modes, they may cause degradation in the encoding efficiency. Moreover, since the filter coefficients determined at every frame should be transmitted to an image decoding apparatus by an image encoding apparatus, they may increase the bit rate.

DISCLOSURE

Technical Problem

Therefore, the present disclosure has been made in an effort to adaptively determine coefficients of an interpolation filter in encoding an image, simultaneously while reducing the quantity of bits for encoding of information on the adaptively determined filter coefficients, thereby improving the encoding efficiency or the compression efficiency.

Technical Solution

One aspect of the present disclosure provides an image encoding method, the method comprising: encoding a filter flag which indicates whether default interpolation filter coefficients are used to predict one or more blocks in a current image unit; if the default interpolation filter coefficients are not used for the current image unit, determining interpolation filter coefficients for the current image unit and encoding an information on the interpolation filter coefficients for the current image unit into a bit stream; interpolating pixels in a reference frame for predicting a current block in the current image unit by using the interpolation filter coefficients for the current image unit; generating a prediction block of the current block from the interpolated pixels in the reference frame; and encoding the current block into the bit stream by using the prediction block.

Another aspect of the present disclosure provides an image decoding apparatus, the apparatus comprising: a filter flag decoder configured to reconstruct a filter flag of a current image unit from a bit stream; a coefficient decoder configured to determine interpolation filter coefficients of the current image unit as default interpolation filter coefficients when the filter flag indicates a first mode, and reconstruct an information on the interpolation filter coefficients for the current image unit from the bit stream and determine the interpolation filter coefficients of the current image unit from the reconstructed information, when the filter flag indicates a second mode; and an image decoder configured to reconstruct a motion vector of a current block in the current image unit from the bit stream, interpolate pixels in a reference frame based on the motion vector of the current block and generate a prediction block of the current block, and reconstruct the current block by using the prediction block of the current block.

Yet another aspect of the present disclosure provides an image decoding method, the method comprising: reconstructing a filter flag of a current image unit from a bit stream; determining interpolation filter coefficients of the current image unit as default interpolation filter coefficients when the filter flag indicates a first mode; reconstructing an information on the interpolation filter coefficients for the current image unit from the bit stream; determining the interpolation filter coefficients of the current image unit from the reconstructed information, when the filter flag indicates a second mode; reconstructing a motion vector of a current block in the current image unit from the bit stream; interpolating pixels in a reference frame based on the motion vector of the current block and generate a prediction block of the current block; and reconstructing the current block by using the prediction block of the current block.

Advantageous Effects

As described above, the present disclosure can adaptively determine coefficients of an interpolation filter in encoding an image, simultaneously while reducing the quantity of bits for encoding of information on the adaptively determined filter coefficients, thereby improving the encoding efficiency or the compression efficiency.

MODE FOR INVENTION

Figure 1:
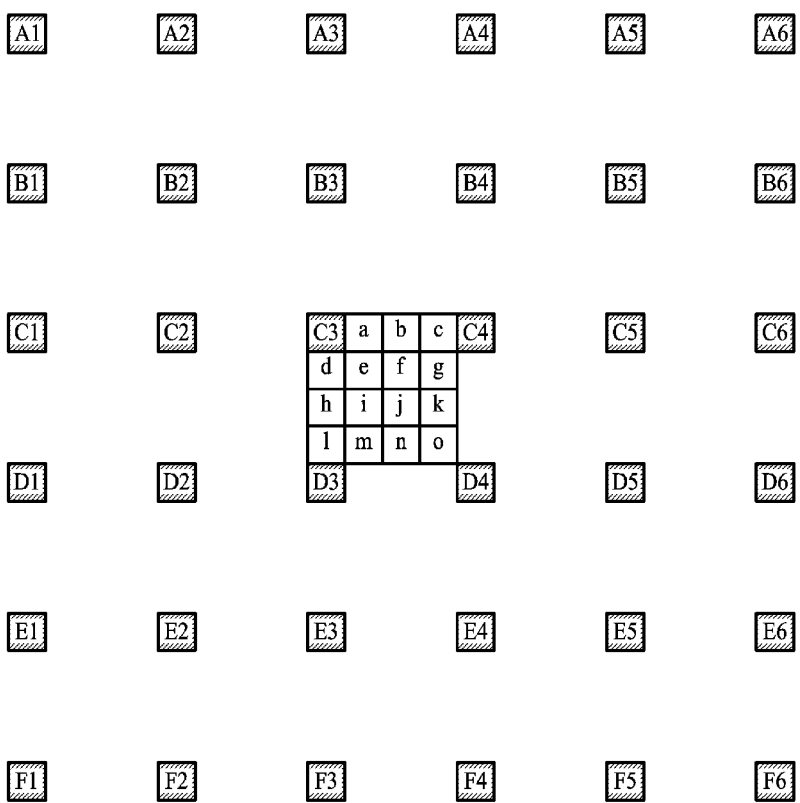
FIG. 1 is an exemplary diagram of a relation between a reference frame interpolated by the unit of fractional pixel and a pixel position of an integer pixel.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is an exemplary diagram of a relation between a pixel in a reference frame interpolated by the unit of fractional pixel and a pixel position of an integer pixel.

Referring to FIG. 1, An, Bn, Cn, Dn, En, and Fn refer to integer pixels (wherein, n=1, 2, 3, 4, and 5), and b, h, and j refer to ½ fractional pixels generated by 6-tap filtering the integer pixels. The 6-tap filter has coefficients of (1, −5, 20, 20, −5, 1)/32 for the 6-tap filtering. By applying the 6-tap filter to the six integer pixels in a vertical or horizontal direction and 6-tap filtering the six integer pixels, the ½ fractional pixels are generated. For example, it is possible to obtain the ½ fractional pixel (b) by applying the 6-tap filter to the horizontal integer pixels C1, C2, C3, C4, C5, and C6, which can be expressed by Equation 1.

$$b=\mathrm{round}((C1-5\times C2+20\times C3+20\times C4-5\times C5+C6)/32) \quad \text{Equation 1}$$

Herein, round( ) refers to a round-off calculation into an integer. Remaining ¼ fractional pixels a, c, d, e, f, g, i, k, l, m, n, and o, except for b, h, and j, are generated by average value filtering of the integer pixels and the ½ fractional pixels. For example, by the average value filtering of integer pixel C3 and ½ fractional pixel (b), ¼ fractional pixel (a) is linearly interpolated and generated. This can be expressed by Equation 2.

$$a=\mathrm{round}((C1+b)/2) \quad \text{Equation 2}$$

As described above, in the compression technology, such as H.264, by way of the generation of ½ fractional pixels by using integer pixels and the generation of ¼ fractional pixels by using integer pixels and ½ fractional pixels, pixels in a reference frame interpolated by the unit of ¼ fractional pixel as illustrated in FIG. 1 is generated and the motion prediction for the inter prediction is performed using the interpolated pixels in a reference frame.

In H.264, when an inter block is predicted, a motion prediction and compensation is performed with the fractional pixel precision by using the interpolated reference pixels as described above. Therefore, it is possible to obtain higher compression efficiency than the conventional method which performs a motion prediction and compensation with the integer pixel precision. However, when the reference pixels are interpolated by using fixed interpolation filter coefficients (that is, default interpolation filter coefficients), such as 6-tap filter coefficients, it is impossible to obtain an optimum performance due to the lack of consideration in the aliasing, camera noise, block mode (or attributes according to the block mode), etc.

To this end, an adaptive interpolation filter technique has been developed, and refers to a technique of interpolating pixels a reference frame by using optimum interpolation filter coefficients determined at every frame instead of fixed interpolation filter coefficients. Use of the adaptive interpolation filter technique not only can solve the problems, which can be caused by the user of fixed interpolation filter coefficients, but can also minimize the prediction errors, thereby further improving the compression efficiency.

However, even in the adaptive interpolation filter technique, since the interpolation filter coefficients determined at every frame are not optimum for all the inter blocks, the interpolation filter coefficients determined at every frame should be transmitted to an image decoding apparatus, which may increase the bit rate and thereby degrade the compression efficiency.

Figure 2:
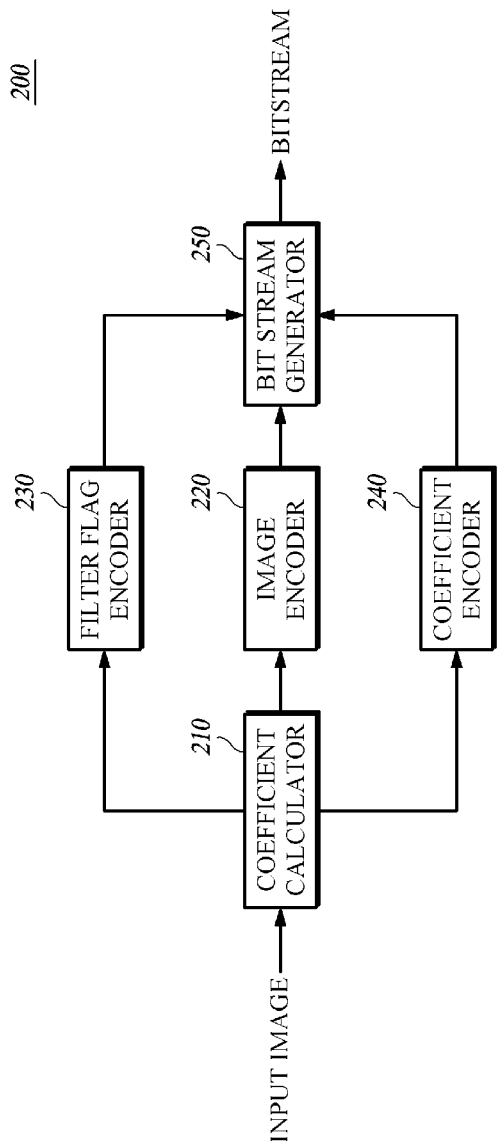
FIG. 2 is a schematic block diagram of a construction of an image encoding apparatus according to an aspect of the present disclosure.

FIG. 2 is a schematic block diagram illustrating a construction of an image encoding apparatus according to an aspect of the present disclosure.

Referring to FIG. 2, the image encoding apparatus 200 according to an aspect of the present disclosure includes a coefficient calculator 210, an image encoder 220, a filter flag encoder 230, a coefficient encoder 240, and a bit stream generator 250. The image encoding apparatus 200 may be a Personal Computer (PC), a notebook computer, a Personal Digital Assistant (PDA), a Portable Multimedia Player (PMP), a PlayStation Portable (PSP), a mobile communication terminal, etc. Further, the image encoding apparatus 200 refers to various devices including a communication device apparatus, such as a communication modem, for communicating with various devices or a wired/wireless communication network, a memory for storing various programs and data for encoding an image, and a microprocessor, etc., for calculating and controlling by executing a program.

The coefficient calculator 210 calculates interpolation filter coefficients (that is, interpolation filter coefficients candidate) of a current frame. That is, for every frame of an input image, the coefficient calculator 210 calculates interpolation filter coefficients of a current frame to be currently encoded, thereby outputting interpolation filter coefficients.

To this end, the coefficient calculator 210 accumulates information for calculating interpolation filter coefficients for a current frame of an input image and calculates interpolation filter coefficients of the current frame by using the accumulated information. For example, the coefficient calculator 210 accumulates the N×M matrix, which indicates multiplication between pixels of reference frame indicated by motion vector of the current block to be currently encoded in the current frame, and the N vector, which indicates multiplication between a current pixel and pixels of a reference frame indicated by motion vector of the current block, as information for calculation of interpolation filter coefficients for the current frame. In this event, the motion vector may be determined after interpolation of pixels in the reference frame by using fixed interpolation filter coefficients employed in H.264.

Figure 3:
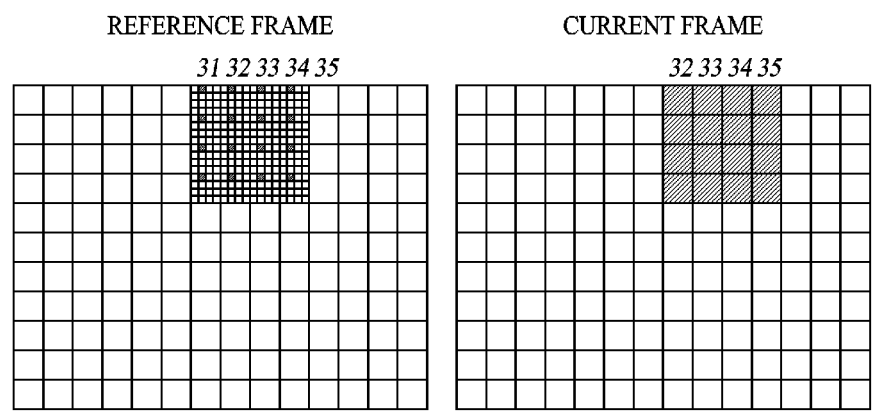
FIG. 3 illustrates an example of a current block of a current frame together with blocks of reference frame interpolated by the unit of fractional pixels.

FIG. 3, which illustrates an example of a current block of a current frame together with a block of a reference frame interpolated by the unit of fractional pixels, shows pixels most similar to the current block on an assumption that a motion vector of the current block determined by the unit of ¼ fractional pixel is (−3,0) when the motion vector of the current block, which is a 4×4 sub-block, is determined by using reference pixels interpolated by using the fixed interpolation filter coefficients employed in H.264.

Figures 4A, 4B:
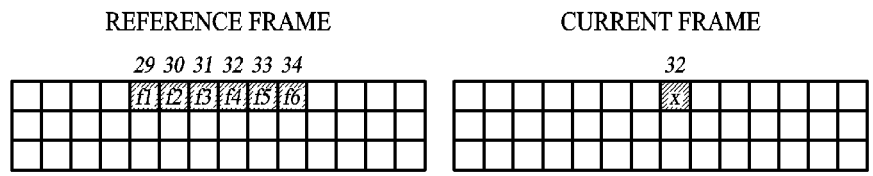
FIGS. 4A and 4B are views for describing an exemplary process of calculating interpolation filter coefficients by using the N×M matrix and the N vector.

A motion vector in the unit of integer pixel, which has been transformed from the motion vector in the unit of ¼ fractional pixel of the current block shown in FIG. 3, is (−1,0), and 6 pieces of pixel information are necessary in order to calculate 6 filter coefficients. Therefore, referring to FIGS. 4A and 4B for describing an exemplary process of calculating interpolation filter coefficients by using the N×M matrix and the N vector, the N×M matrix and the N vector as shown in FIG. 4B may be calculated and accumulated as information by using pixel values of the pixels located at (29,0)~(34,0) of the reference frame and the pixel located at (32,0) of the current frame shown in FIG. 4A. Likewise, the N×M matrix and the N vector for the pixel located at (33,0) of the current frame may be calculated and accumulated as information by using the 6 pixel values of the pixels located at (30,0)~(35,0) of the reference frame.

In other words, products of multiplication between pixel values of pixels of a reference frame are calculated and then accumulated as the N×M matrix, and products of multiplication between pixel values of pixels of a reference frame indicated by the motion vector and pixels of the current frame are then calculated and accumulated as the N vector. Thereafter, when the products for all the pixels have been accumulated, the interpolation filter coefficients are calculated. Although the above description is based on an assumption that the interpolation filter coefficients are calculated by accumulating and using the N×M matrix and the N vector, any information capable of calculating the interpolation filter coefficients, as well as the N×M matrix and the N vector, may be accumulated and used for calculation of the interpolation filter coefficients.

Further, the coefficient calculator 210 may calculate interpolation filter coefficients of a current frame according to one or more combinations of a block mode of the current block and a block mode set of the current block. That is, the coefficient calculator 210 accumulates information for calculating the interpolation filter coefficients of a current frame according to one or more combinations of a block mode of the current block and a block mode set of the current block, and calculates interpolation filter coefficients of the current frame by using the accumulated information. In this event, the block mode set refers to a set of multiple block modes, and all block modes of the current frame may be grouped into one block mode set or multiple block mode sets, for each of which the interpolation filter coefficients may be calculated. Here, under the H.264/AVC standard, the multiple block modes may be the SKIP mode, the inter 16×16 mode, the inter 16×8 mode, the inter 8×16 mode, the inter 8×8 mode, the inter 8×4 mode, the inter 4×8 mode, the inter 4×4 mode, the intra 16×16 mode, the intra 4×4 mode, etc., but they are not limited thereto and may include other various block modes.

The image encoder 220 interpolates pixels in the reference frame by using adaptive interpolation filter coefficient determined from the calculated interpolation filter coefficient of the current frame or interpolation filter coefficient of another frame and encodes the current block by using the interpolated reference pixels. Specifically, the image encoder 220 interpolates the reference pixels by using the adaptive interpolation filter coefficient of the current frame. Further, by using the interpolated reference pixels, the image encoder 220 performs motion prediction and compensation of each block of the current frame to generate a predicted block of each current block to be encoded, and encodes each residual block generated through subtraction between each current block and a corresponding predicted block, thereby outputting an encoded current block obtained by encoding the current block. The process of encoding the current block by using the interpolation filter coefficient is obvious to one skilled in the art, so a detailed description thereof is omitted here.

The filter flag encoder 230 generates and encodes a coefficient-inserted flag or a coefficient non-inserted flag as a filter flag according to the calculated interpolation filter coefficients of the current frame. Specifically, the filter flag encoder 230 determines whether to encode and transmit the interpolation filter coefficients of the current frame according to the interpolation filter coefficients of the current frame output from the coefficient calculator 210. Then, the filter flag encoder 230 generates a coefficient-inserted flag as the filter flag when it has determined to encode and transmit the calculated interpolation filter coefficients, and generates a coefficient non-inserted flag as the filter flag when it has determined not to encode and transmit the calculated interpolation filter coefficients. Then, the filter flag encoder 230 encodes the generated filter flag.

For example, the filter flag encoder 230 may generate a coefficient non-inserted flag as the filter flag when an interpolation filter coefficient difference, which is the difference between calculated interpolation filter coefficients of the current frame and interpolation filter coefficients of another frame, is smaller than or equal to a preset threshold, and may generate a coefficient inserted flag as the filter flag when the interpolation filter coefficient difference is larger than the preset threshold. In this event, another frame may be a frame encoded before the current frame is encoded.

That is, as in the example described above, when it is determined that predetermined interpolation filter coefficients generated or used in the previous frame is similar to the calculated interpolation filter coefficients of the current frame and the interpolation and encoding of the reference frame by using the interpolation filter coefficients of the previous frame do not show a big difference in the compression efficiency, it is possible to omit the transmission of the calculated interpolation filter coefficients of the current frame to an image decoding apparatus, which may reduce the bit rate and thereby improve the compression efficiency.

In this event, if the filter flag is set to be a binary digit having 1 bit, such as "0" or "1" (for example, when the coefficient-inserted flag is "1" and the coefficient non-inserted flag is "0", or vice versa), the filter flag may not be additionally encoded. However, when the filter flag is set to be another type of information or multiple bits, such as "000" or "111", the filter flag may be encoded into a binary digit. Further, the filter flag encoder 230 may set the filter flag for each block mode or each block mode set, and may set one filter flag for one frame when the current frame has a single block mode set.

The coefficient encoder 240 encodes calculated interpolation filter coefficients of the current frame when the filter flag is a coefficient-inserted flag. That is, when the filter flag of the current frame or each block (or each block set) of the current frame is set as a coefficient-inserted flag by the coefficient calculator 210, the coefficient encoder 240 encodes the interpolation filter coefficients of the current frame output by the coefficient calculator 210, to output encoded interpolation filter coefficients of the current frame. In this event, the coefficient encoder 240 may use various encoding schemes including the entropy encoding scheme for the encoding of the interpolation filter coefficients of the current frame.

The bit stream generator 250 generates and outputs a bit stream, which includes an encoded current frame and an encoded filter flag, and further includes encoded interpolation filter coefficients of the current frame when the filter flag is a coefficient-inserted flag. In other words, the bit stream generator 250 basically generates and outputs a bit stream, which includes an encoded current frame output from the image encoder 220 and an encoded filter flag output from the filter flag encoder 230. When the filter flag output from the filter flag encoder 230 is a coefficient non-inserted flag, the bit stream generator 250 outputs the generated bit stream without change. However, when the filter flag output from the filter flag encoder 230 is a coefficient-inserted flag, the bit stream generator 250 outputs the bit stream after inserting the encoded interpolation filter coefficients of the current frame output from the coefficient encoder 240 in the bit stream.

In this event, the bit stream generator 250 may include one or more combinations of the encoded filter flag and the encoded adaptive interpolation filter coefficients in a slice header of the bit stream. Further, when the interpolation filter coefficients has been calculated for each block mode, the bit stream generator 250 may include one or more combinations of the encoded filter flag and the encoded interpolation filter coefficients in a block header of the bit stream.

Figure 5:
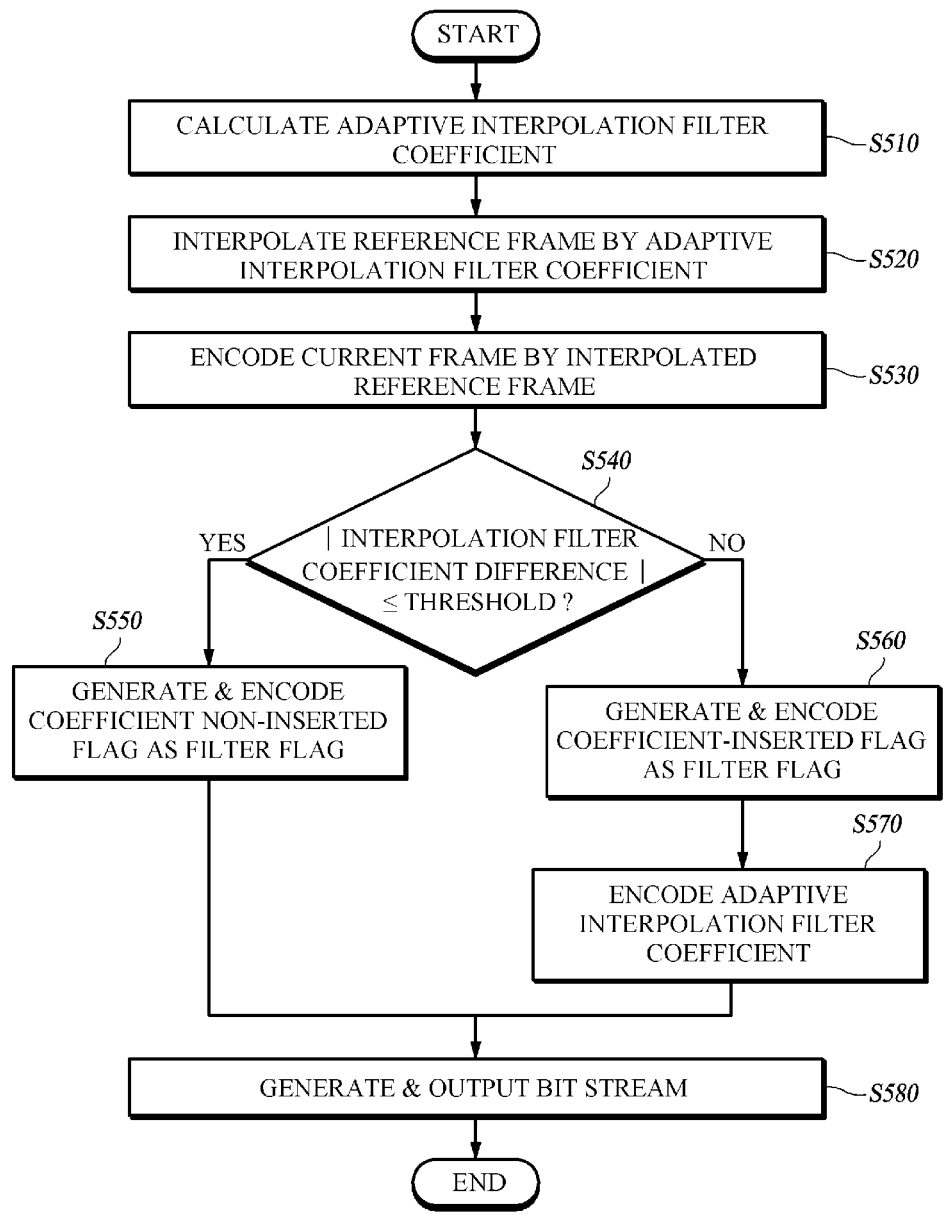
FIG. 5 is a flowchart for describing an image encoding method according to an aspect of the present disclosure.

FIG. 5 is a flowchart for describing an image encoding method according to an aspect of the present disclosure.

When there is an input image, the image encoding apparatus 200 interpolates pixels in a reference frame of a current frame to be currently encoded in the input image by using fixed interpolation filter coefficients, to accumulate information for calculation of interpolation filter coefficients and calculate the interpolation filter coefficients of the current frame by using the accumulated information (step S510), interpolates the reference pixels by using the calculated interpolation filter coefficients of the current frame (step S520) and encodes the current frame by using the interpolated reference pixels (step S530).

In order to set a filter flag, the image encoding apparatus 200 compares the interpolation filter coefficients of the current frame calculated in step S510 with preset interpolation filter coefficients of another frame, to determine whether a difference or an absolute value of the difference between the two coefficients is smaller than or equal to a preset threshold (step S540), generates and encodes a coefficient non-inserted flag as a filter flag when the difference or an absolute value of the difference is smaller than or equal to the preset threshold (step S550), generates and encodes a coefficient-inserted flag as a filter flag when the difference or an absolute value of the difference is larger than the preset threshold (step S560), and then encodes the calculated interpolation filter coefficients of the current frame (step S570).

According to whether the filter flag is a coefficient-inserted flag or a coefficient non-inserted flag, the image encoding apparatus 200 may generate and output a bit stream including the current frame encoded in step S530 and the filter flag encoded in step S550 or a bit stream including the current frame encoded in step S530, the filter flag encoded in step S560, and the calculated interpolation filter coefficients of the current frame encoded in step S570 (step S580).

As described above, the image having been encoded into a bit stream by the image encoding apparatus 200 may be transmitted to an image decoding apparatus to be described later via a wired/wireless communication network, such as the internet, a local wireless communication network, a wireless LAN network, a Wibro (Wireless Broadband) network also known as WiMax network, and a mobile communication network, or a communication interface, such as a cable and a Universal Serial Bus (USB) in real time or in non-real time, so that the transmitted image can be decoded in the image decoding apparatus, and the decoded image can be reconstructed and reproduced.

Figure 6:
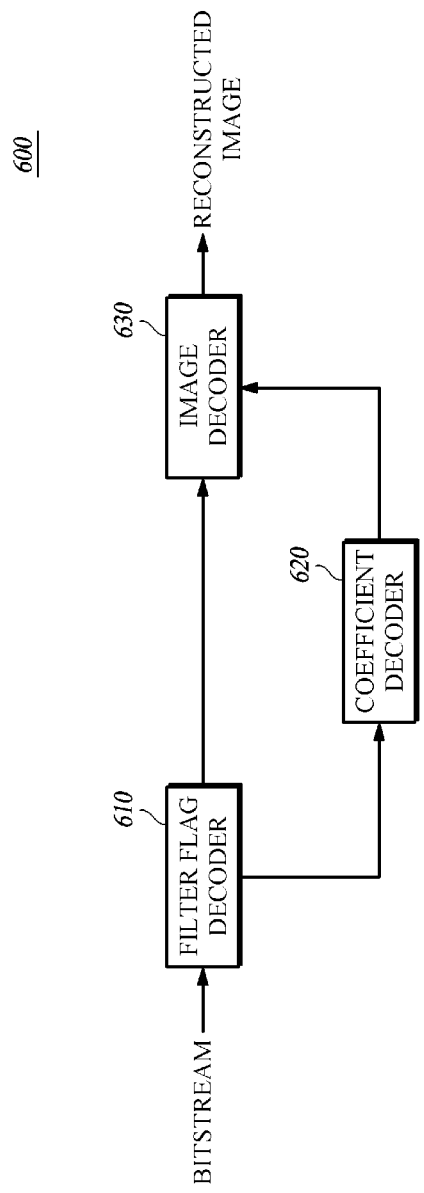
FIG. 6 is a schematic block diagram illustrating a construction of an image decoding apparatus according to an aspect of the present disclosure.

FIG. 6 is a schematic block diagram illustrating a construction of an image decoding apparatus according to an aspect of the present disclosure.

The image decoding apparatus 600 according to an aspect of the present disclosure includes a filter flag decoder 610, a coefficient decoder 620, and an image decoder 630. The image decoding apparatus 600 may be a Personal Computer (PC), a notebook computer, a Personal Digital Assistant (PDA), a Portable Multimedia Player (PMP), a PlayStation Portable (PSP), a mobile communication terminal, etc. Further, the image decoding apparatus 1000 refers to various devices including a communication device apparatus, such as a communication modem, for communicating with various devices or a wired/wireless communication network, a memory for storing various programs and data for encoding an image, and a microprocessor, etc., for calculating and controlling by executing a program.

The filter flag decoder 610 extracts and decodes an encoded filter flag from a bit stream, to reconstruct and output a filter flag. The filter flag decoder 610 may extract the encoded filter flag from a header of an image unit such as a slice or a block of the bit stream.

When the reconstructed filter flag is a coefficient-inserted flag, the coefficient decoder 620 extracts and decodes encoded interpolation filter coefficients of the current frame from the bit stream, to reconstruct and output the interpolation filter coefficients of the current frame. In this event, the coefficient decoder 620 may extract the encoded interpolation filter coefficients of the current frame from the slice header of the bit stream. Further, the interpolation filter coefficients of the current frame reconstructed by the coefficient decoder 620 may be interpolation filter coefficients calculated for each block mode of the current frame or each block mode set of the current frame.

The image decoder 630 extracts an encoded current frame from the bit stream, interpolates pixels in a reference frame by using a reconstructed motion vector, and the interpolation filter coefficients of the current frame or an interpolation filter coefficients of another frame determined according to the filter flag, and decodes the encoded current block in the current frame by using the interpolated reference pixels, to reconstruct and output the current frame.

For example, when the filter flag output from the filter flag decoder 610 is a coefficient-inserted flag, the image decoder 630 interpolates reference pixels by using the interpolation filter coefficients of the current frame output from the coefficient decoder 620, and decodes the current frame by using the interpolated reference pixels. When the filter flag output from the filter flag decoder 610 is a coefficient non-inserted flag, the image decoder 630 interpolates pixels in a reference frame by using the motion vector and interpolation filter coefficients of another preset frame, and decodes the encoded current block by using the interpolated reference pixels. In this event, said another preset frame may be a frame decoded before the current frame is decoded. Meanwhile the predicting and decoding of an encoded current frame by using the interpolated reference frame by the image decoder 630 is obvious to one skilled in the art, so a detailed description thereof is omitted here.

Figure 7:
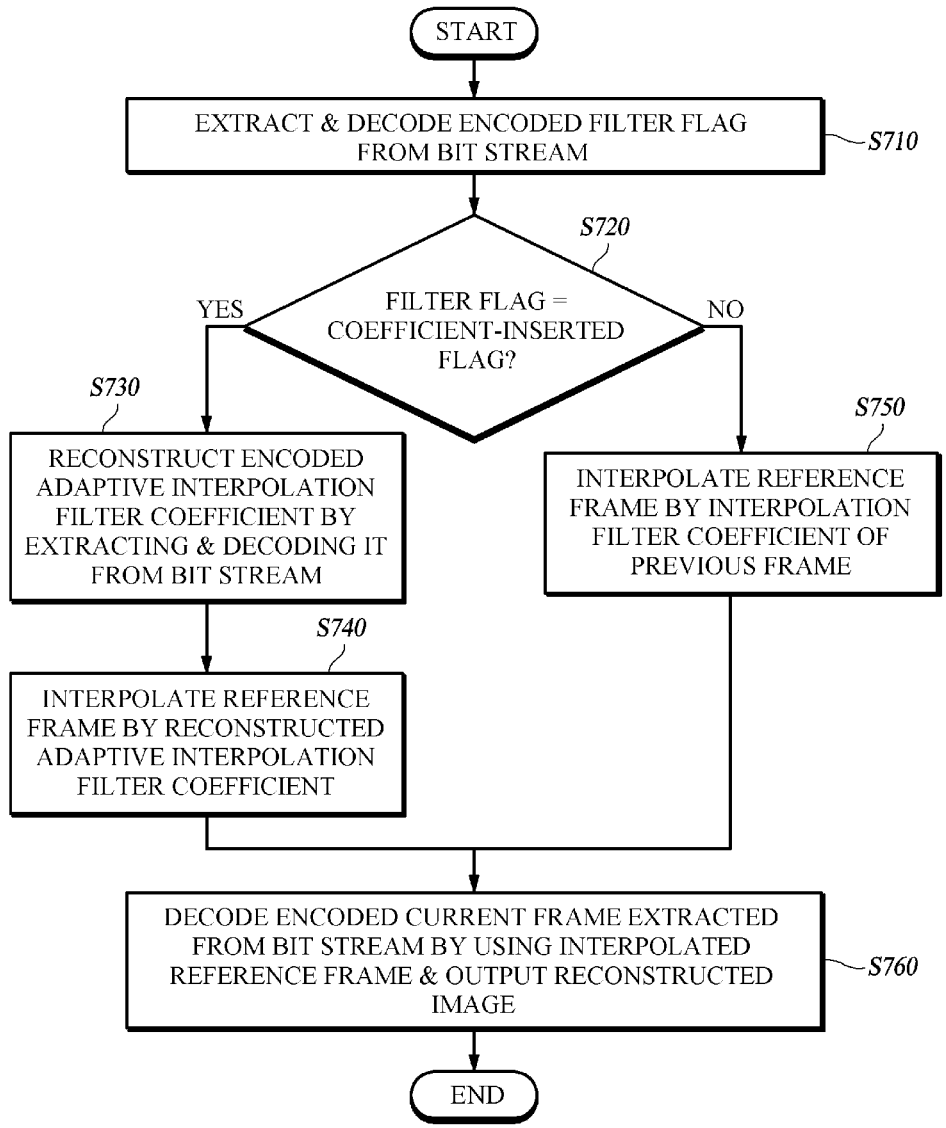
FIG. 7 is a flowchart for describing an image decoding method according to an aspect of the present disclosure.

FIG. 7 is a flowchart for describing an image decoding method according to an aspect of the present disclosure.

After receiving and storing a bit stream for an image through a wired/wireless communication network or cable, the image decoding apparatus 600 decodes and reconstructs the image in order to reproduce the image according to an algorithm of another program being executed or according to user's selection.

To this end, the image decoding apparatus 600 extracts an encoded filter flag from a bit stream and decodes the extracted filter flag, to reconstruct the filter flag (step S710), and determines whether the filter flag is a coefficient-inserted flag (step S720). Then, when the filter flag is a coefficient-inserted flag, the image decoding apparatus 600 extracts encoded interpolation filter coefficients of the current frame from the bit stream, to reconstruct the interpolation filter coefficients of the current frame (step S730), and interpolates pixels in a reference frame by using the reconstructed interpolation filter coefficients of the current frame (step S740). When the filter flag is a coefficient non-inserted flag, the image decoding apparatus 600 interpolates pixels in a reference frame by using interpolation filter coefficients of another frame (for example, a previous frame decoded before the current frame) (step S750), and extracts an encoded current frame from the bit stream and decodes the current frame by using the reference pixels interpolated in step S740 or step S750, to reconstruct the current frame and output the current frame as a reconstructed image (step S760).

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of encoding and decoding an image, so as to adaptively determine coefficients of an interpolation filter in encoding an image, simultaneously while reducing the quantity of bits for encoding of information on the adaptively determined filter coefficients. Therefore, the present disclosure can improve the encoding efficiency or the compression efficiency.

CROSS-REFERENCE TO RELATED APPLICATION

If applicable, this application claims priority under 35 U.S.C §119(a) on Patent Application No. 10-2008-0104515 filed in Korea on Oct. 24, 2008, the entire content of which is hereby incorporated by reference. In addition, this non-provisional application claims priority in countries, other than the U.S., with the same reason based on the Korean Patent Application, the entire content of which is hereby incorporated by reference.

The invention claimed is:

1. An image encoding method, the method comprising:
encoding a filter flag which indicates whether default interpolation filter coefficients are used as interpolation filter coefficients for a current image unit to predict one or more blocks in the current image unit, wherein the default interpolation filter coefficients are either (i) interpolation filter coefficients used in an image unit preceding the current image unit or (ii) interpolation filter coefficients set in a larger image unit to which the current image unit belongs to;

when the default interpolation filter coefficients are not used for the current image unit, determining interpolation filter coefficients for the current image unit and encoding an information on the interpolation filter coefficients for the current image unit into a bit stream wherein, when the default interpolation filter coefficients are used as the interpolation filter coefficients for the current image unit, the information on the interpolation filter coefficients for the current image unit is not encoded into the bit stream;

interpolating pixels in a reference frame for predicting a current block in the current image unit by using the interpolation filter coefficients for the current image unit;

generating a prediction block of the current block from the interpolated pixels in the reference frame; and encoding the current block into the bit stream by using the prediction block.

2. The image encoding method of claim 1, wherein the default interpolation filter coefficients are interpolation filter coefficients having predetermined values.

3. The image encoding method of claim 1, wherein the encoding of the information on the interpolation filter coefficients comprises:
encoding respective interpolation filter coefficients for the current image unit into the bit stream.

4. The image encoding method of claim 1, wherein the encoding of the information on the interpolation filter coefficients comprises:
encoding an information on a collective set of the interpolation filter coefficients for the current image unit into the bit stream.

5. The image encoding method of claim 1, wherein the current image unit for which the filter flag is encoded is one of a frame and a slice in a frame.

6. An image decoding apparatus, the apparatus comprising:
a filter flag decoder configured to reconstruct a filter flag of a current image unit from a bit stream;
a coefficient decoder configured to
determine interpolation filter coefficients for the current image unit as default interpolation filter coefficients when the filter flag indicates that the default interpolation filter coefficients are used as the interpolation filter coefficients for the current image unit to predict one or more blocks in the current image unit, wherein the default interpolation filter coefficients are either (i) interpolation filter coefficients used in an image unit preceding the current image unit or (ii) interpolation filter coefficients set in a larger image unit to which the current image unit belongs, and
reconstruct an information on the interpolation filter coefficients for the current image unit from the bit stream and determine the interpolation filter coefficients for the current image unit from the reconstructed information, when the filter flag indicates that the default interpolation filter coefficients are not used for the current image unit; and
an image decoder configured to
reconstruct a motion vector of a current block in the current image unit from the bit stream,
interpolate pixels in a reference frame based on the motion vector of the current block and generate a prediction block of the current block, and
reconstruct the current block by using the prediction block of the current block.

7. The image decoding apparatus of claim 6, wherein the default interpolation filter coefficients are interpolation filter coefficients having predetermined values.

8. The image decoding apparatus of claim 6, wherein the coefficient decoder determines respective interpolation filter coefficients for the current image unit from the bit stream.

9. The image decoding apparatus of claim 6, wherein the coefficient decoder is configured to reconstruct an information on a collective set of the interpolation filter coefficients for the current image unit from the bit stream.

10. The image decoding apparatus of claim 6, wherein the current image unit for which the filter flag is decoded is one of a frame and a slice in a frame.

11. An image decoding method, the method comprising:
reconstructing a filter flag of a current image unit from a bit stream;
determining interpolation filter coefficients for the current image unit as default interpolation filter coefficients when the filter flag indicates that the default interpolation filter coefficients are used as the interpolation filter coefficients for the current image unit to predict one or more blocks in the current image unit, wherein the default interpolation filter coefficients are either (i) interpolation filter coefficients used in an image unit preceding the current image unit or (ii) interpolation filter coefficients set in a larger image unit to which the current image unit belongs;
reconstructing an information on the interpolation filter coefficients for the current image unit from the bit stream and determining the interpolation filter coefficients for the current image unit from the reconstructed information, when the filter flag indicates that the default interpolation filter coefficients are not used for the current image unit;
reconstructing a motion vector of a current block in the current image unit from the bit stream;
interpolating pixels in a reference frame based on the motion vector of the current block and generate a prediction block of the current block; and
reconstructing the current block by using the prediction block of the current block.

12. The image decoding method of claim 11, wherein the default interpolation filter coefficients are interpolation filter coefficients having predetermined values.

13. The image decoding method of claim 11, further comprising
determining respective interpolation filter coefficients for the current image unit from the bit stream.

14. The image decoding method of claim 11, wherein the reconstructing of the information on the interpolation filter coefficients comprises:
reconstructing an information on a collective set of the interpolation filter coefficients for the current image unit from the bit stream.

15. The image decoding method of claim 11, wherein the current image unit for which the filter flag is decoded is one of a frame and a slice in a frame.

* * * * *